Aug. 24, 1926.
C. NEWMAN ET AL
BOX SUPPORTING EAR
Filed Nov. 8, 1924
1,597,243
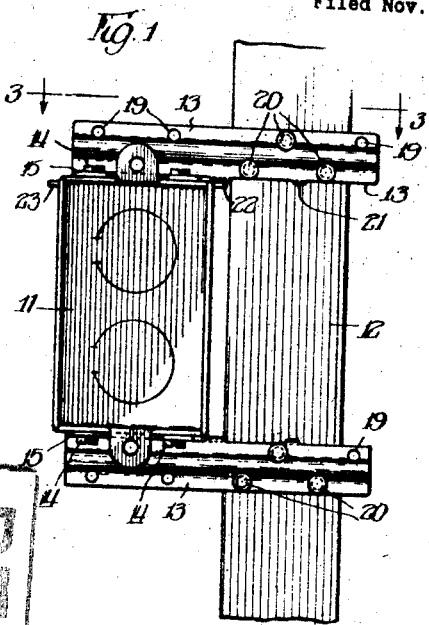
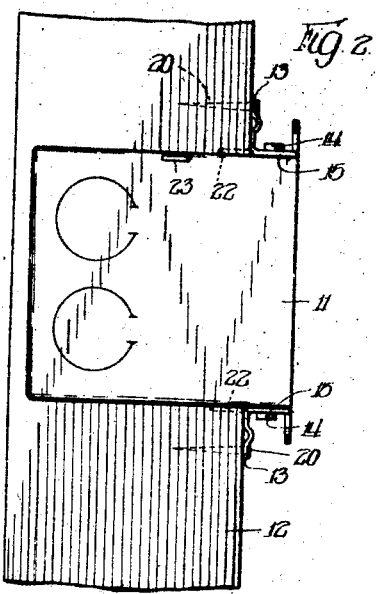
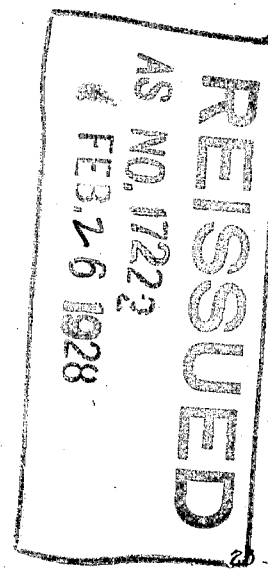
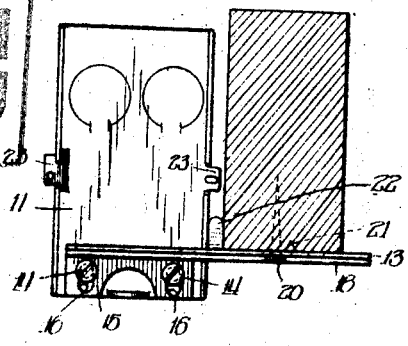
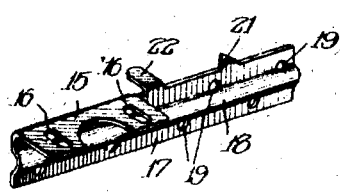
Inventors:
Charles Newman,
Ernst G. Appleton, Patented Aug. 24, 1926.

UNITED STATES PATENT OFFICE.

CHARLES NEWMAN AND ERNST G. APPLETON, OF CHICAGO, ILLINOIS, ASSIGNORS TO ROACH-APPLETON MFG. COMPANY, OF CHICAGO, ILLINOIS, A CORPORATION OF ILLINOIS.

BOX-SUPPORTING EAR.

Application filed November 8, 1924. Serial No. 748,546.

This invention relates to a new and improved box supporting ear and more particularly to an ear adapted for use with switch boxes or the like in supporting them from building studding.

Switch and junction boxes and the like are manufactured in a wide variety of types, but in general are supported from the building structure by means of ears which are adjustably secured to the box and have outturned portions extending in a plane parallel to the face of the box for securing the ears to lath or cross pieces. These ears project from the ends of the usual types of switch boxes and since the boxes are normally used extending vertically in the walls, it is necessary to provide supporting cross pieces between adjacent studs to receive the ears.

It is an object of the present invention to provide a box supporting ear adapted to be secured to the end of the box and to engage a member extending adjacent the side of the box to support the box therefrom.

It is a further object to provide a box supporting ear of this type having integral means adapted to fix it in relation to the box supporting member.

It is also an object to provide a laterally extending box supporting ear provided with a stiffening corrugation and adapted to be formed from sheet metal.

It is an additional object to provide a box supporting ear having means for properly spacing the box from the support to which it is secured.

Other and further objects will appear as the description proceeds.

We have shown in the accompanying drawings one preferred form of construction. In the drawings—

Figure 1 is a face view of a box attached by means of our supporting ears.

Figure 2 is a view of Figure 1 as seen from the left.

Figure 3 is a view of Figure 1 as seen from above and

Figure 4 is a perspective view of the supporting ear.

In the drawings a typical form of switch box 11 has been shown supported from a vertically extending stud 12 by means of the box supporting ears 13.

As shown in Figure 3, the box 11 is provided at its ends with the screws 14 adapted to secure the ears to the box. This is a usual construction, as the boxes are commonly supported by ears secured to the box in this manner.

As best shown in Figure 4, the present ear comprises a securing portion 15 adapted to lie flat against the end wall of the box, this portion being provided with the elongated slots 16 adapted to adjustably receive the screws 14. The ear is further provided with the attaching portion 17, which is bent up at right angles to the portion 15 and which consequently is located in a plane substantially parallel to the box face when the ear is attached to the box. The portion 17 is provided with the stiffening corrugations 18 and the plurality of perforations 19 which latter are adapted to receive nails 20 or other means for securing the ear to a stud or other supporting means. The ears, therefore, form cantilever supports.

The upper edge of the ear portion 17 is provided with a pointed down-turned lug 21, which is for the purpose of insuring the placing of the box properly parallel to the supporting stud and evenly spaced therefrom when the box is spaced well away from the stud. In this case nails would be driven into the stud only through the two holes shown beyond the lug 21. When the box is placed closely adjacent the stud, the lug 21 is forced into the stud as shown in the drawing.

The ears are also provided with the lugs 22, which serve to space the box from the support and insure it being placed parallel thereto. These lugs 22 are of sufficient width to provide clearance for the box assembly ears 23.

By the use of our improved ear, it is possible to secure switch boxes or the like to vertically extending studs and the necessity for extra cross timbers for supporting the box is eliminated. The ear is simple in design and construction and may be cheaply manufactured from sheet metal. It is adapted for ready attachment to standard forms of switch or junction boxes.

While we have shown one preferred form of our ear by way of illustration, it is to be understood that we contemplate such changes and modifications as come within the scope of the appended claim.

We claim:—

A cantilever support for a switch box comprising an ear swedged out of a single piece of metal, said ear comprising an elongated attaching portion having holes for the reception of attaching means for connecting same to a wall stud, said ear also comprising a securing portion mounted at one end of said attaching portion and projecting substantially at right angles to the plane of said attaching portion, said securing portion having holes for the reception of attaching means for connecting same to the wall of a switch box, said ear also including a pair of lugs projecting from said attaching portion, one of said lugs being pointed and adapted to dig into a wall stud, the other of said lugs being adapted to lie against said wall stud for locating said ear relative to said wall stud.

Signed at Chicago, Illinois this 5th day of November, 1924.

CHARLES NEWMAN.
ERNST G. APPLETON.